United States Patent [19]

Bariaud et al.

[11] Patent Number: 4,580,792
[45] Date of Patent: Apr. 8, 1986

[54] FLUIDTIGHT LABYRINTH SEAL FOR A TURBO-MACHINE

[75] Inventors: Christian Bariaud, Orsay; Jean-Claude L. Delonge, Corbeil-Essonnes, both of France

[73] Assignee: Societe Nationale d'Etude et de Construction de Moteurs d'Aviation "S.N.E.C.M.A.", Paris, France

[21] Appl. No.: 677,018

[22] Filed: Nov. 30, 1984

[30] Foreign Application Priority Data

Dec. 21, 1983 [FR] France ................ 83 20438

[51] Int. Cl.[4] .......................... F16J 15/44
[52] U.S. Cl. ..................... 277/53; 277/181; 277/190
[58] Field of Search ........... 277/53, 190, 1, 192, 277/181

[56] References Cited

U.S. PATENT DOCUMENTS

| 3,353,245 | 11/1967 | Madson | 277/190 |
|---|---|---|---|
| 3,464,708 | 9/1969 | Hamilton | 277/192 |
| 3,897,169 | 7/1975 | Fowler | 277/53 |
| 4,114,902 | 9/1978 | Orlowski | 277/53 |
| 4,173,252 | 11/1979 | Sakaki | 277/53 |
| 4,422,651 | 12/1983 | Platts | 277/181 |
| 4,436,311 | 3/1984 | Brandon | 277/53 |
| 4,466,620 | 8/1984 | Orlowski | 277/53 |
| 4,531,746 | 7/1985 | Amdall | 277/53 |

Primary Examiner—Robert I. Smith
Attorney, Agent, or Firm—Oblon, Fisher, Spivak, McClelland & Maier

[57] ABSTRACT

A turbo-machine comprises means for securing a fluidtight seal to the shaft thereof including a segment in the shape of a sector of a ring located in a groove formed in the wall of the shaft, the groove and the sector being of complementary shape. The radially outer surface of the sector is in tight contact with the radially inner surface of a part of the seal carrying lips which in turn provide a sealing effect by close proximity to an opposed surface of the seal on another part of the turbine. The segment is made rigid with the shaft by detachable means which pass through the lip carrying member and into the sector. In order to prevent both axial and rotational motion of the sector relatively to the groove, the mating surfaces are toroidal and eccentric with respect to the common axis of the segment and of the shaft.

8 Claims, 3 Drawing Figures

FLUIDTIGHT LABYRINTH SEAL FOR A TURBO-MACHINE

BACKGROUND OF THE INVENTION

1. Field of the Invention

This invention relates to turbo-machines. More particularly the invention relates to connecting means between two cylindrical members, one lying within the other, the members being fixed with respect to one another both parallel to their axes and rotationally. More particularly the invention relates to securing a labyrinth seal on a shaft of a turbo-machine.

2. Summary of the Prior Art

The operation of turbo-machines involves the use of fluids at different pressure levels between zones separated by coaxial members which are rotatable relative to one another which are the source of leakage flows from the high to the low pressure zone at the fluidtight seals. The quality of such fluidtight seals is critical for the performance of the turbo-machine because the leakage flows are important in that they have a direct effect on the overall efficiency of the machine and in particular on the specific consumption of fuel.

Such seals, when they are of the labyrinth type, are constituted by a series of teeth or lips of annular form lying parallel to one another on the periphery of one of the members which is movable with respect to the other, the edge of each lip defining a predetermined clearance with a fluidtight surface provided on the other member.

The lips are liable to wear or deterioration when they inadvertently rub on the fluidtight surface during operation. It is therefore necessary to repair them or replace them.

In instances where the labyrinth seals are mounted on the shaft or on the drum of the corresponding turbomachine, the lips were generally provided by machining from the solid so that it is not possible to replace the lips other than by changing the shaft completely. For this reason it is preferred to machine the lips in thick cylindrical members which are secured on the shaft by bolting or other means. It is thus possible to replace these cylindrical members and readily to repair them when it is necessary.

In current engines, however, it is desirable to reduce the number of bolted connections within the enclosures of the engine of which one wall is constituted by a rotary member, because the fluid friction effect of the bolts within the enclosure gives rise to flow disturbances, and internal heating up, which is undesirable from the point of view of the strength of the members affected.

One object of the present invention is to provide securing means for a fluidtight seal in the form of a cylindrical member on a turbo-machine shaft, of which no part will itself create a flow disturbance or form a protuberance giving rise to heating up by frictional action on the ambient medium.

SUMMARY OF THE INVENTION

According to the present invention there is provided in a turbo-machine means defining a labyrinth seal including a cylindrical member having annular lips on its outer surface, means defining a sealing surface cooperating with the lips, means mounting the cylindrical member having an annular groove, and including an annular segment having one surface complementary to the surface of the groove and engaged in the groove and another surface engaged against the inner surface of the cylindrical member, and removable means for securing the segment to the cylindrical member, the thickness of the segment and the corresponding depth of the groove varying circumferentially so that the seal is secured relative to the mounting means when the segment is made rigid with the seal by the removable securing means.

In accordance with a preferred embodiment the groove is formed in the wall of the shaft and has a toroidal shape eccentric with respect to the common axis of the members and the segment is a sector of a ring symmetrical with respect to the transverse section having a maximum thickness corresponding to the maximum depth of the groove.

One of the supplementary advantages of such a connection means is to maintain the integrity of the shaft. Furthermore the connection means avoid apertures which would be required for a bolt connection, and this is an important factor in the mechanical strength and integrity of the shaft.

Another advantage is the distribution over a large surface of the forces transmitted to the shaft by the seal when it rubs against the adjacent fluidtight element. Thereby local excessive stresses are avoided.

DESCRIPTION OF THE PREFERRED EMBODIMENT

Figure 1:
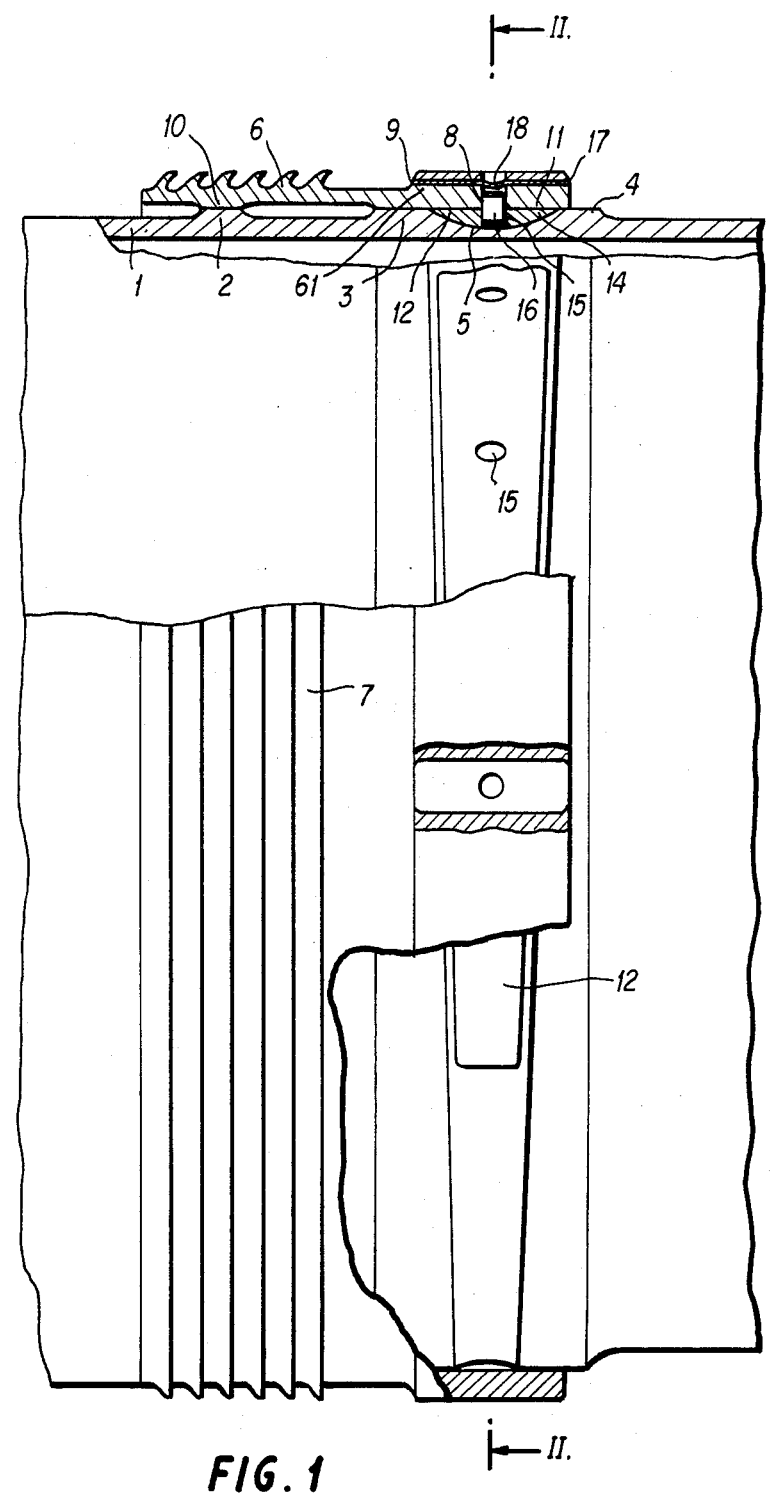
FIG. 1 illustrates a part of the shaft of a turbo-machine in the area of a labyrinth seal with parts broken away revealing securing means.

Referring now to the drawings, in order to assist clarity, members not necessary for adequate understanding of the invention have been omitted.

Figure 2:
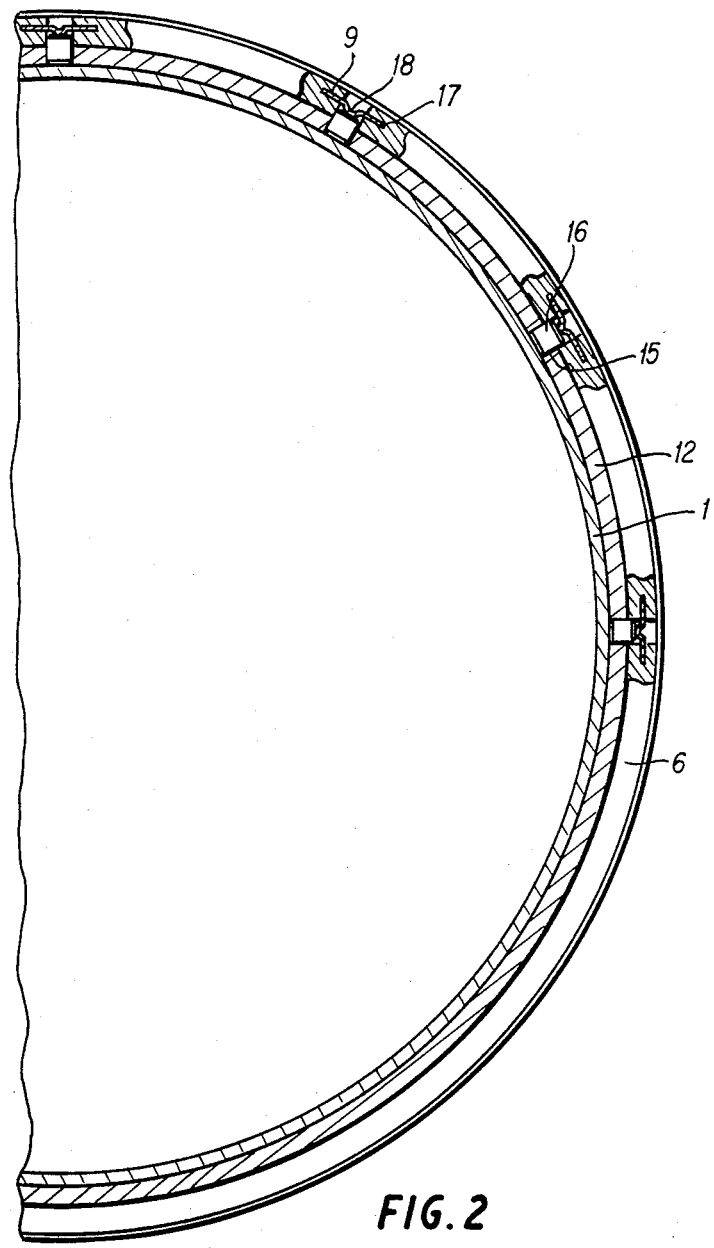
FIG. 2 is one half of a cross-section on the line II—II of FIG. 1.

In FIG. 1, the reference numeral 1 indicates a turbo-machine hollow shaft. The shaft passes through walls of the enclosure of the turbo-machine at different pressure zones, for example, the walls of the enclosures of bearings or diaphragms separating the stages of the compressor or of the turbine, where fluidtight means hereinafter referred to as seals, are necessary. FIG. 1 illustrates the assembly of such a seal on the shaft. The shaft includes on its outer face three cylindrical seats 2,3 and 4 intended to receive the corresponding parts 10 and 11 of an annular member 6 of a labyrinth seal. A groove 5 having a cross-section in the form of a circular arc has been machined between the seats 3 and 4. The toroidal surface thus defined by the groove at its base is eccentric with respect to the axis of the shaft as is apparent from FIG. 2. The labyrinth seal is made as a cylindrical member 6 which has on its outer face a series of circular lips 7 located in radial planes parallel to one another. The lips cooperate with fluidtight sealing surfaces (not shown) mounted concentrically with the shaft on a stator member of the turbo-machine.

By extending it beyond the lips the cylindrical member 6 includes a cylindrical part 61 of greater thickness on which there are provided means for securing the labyrinth on the shaft. To this end a plurality of radial bores 8 are distributed in a plane transverse to the interior of an arc of a circle. In the embodiment illustrated seven bores 8 are distributed over one half of the circumference. An axial slot 9 is provided perpendicularly to each of the bores and traverses from side to side the cylindrical part 61 of the cylindrical member 6 adjacent to its external surface.

Securing means may take the form of cylindrical pins 16 and locking plates 17.

The segment 12 is a sector of a ring shaped in such a way as to be adjusted against the seat 11 of the cylindrical member 6 and the bottom of the groove 5. It is symmetrical with respect to a radial plane passing through the axis of the shaft and the eccentric axis of the groove. In order to enable assembly, the segment is cut at its thinnest part over approximately a quarter of the circumference. It includes a plurality of radial bores 15 corresponding to the bores 8 of the cylindrical member, a cyclindrical securing pin 16 being located in each of the radial holes formed by the bores 8 and 15 when aligned. Each of these pins is radially fixed between the bottom of the groove and a snap plate 17 slid into the slots 9, the plate 17 comprising a central depression 18, of which the convexity locates in the bores 18 thus locking the pins radially and the plates axially.

The assembly process will be clearly apparent on the basis of the preceding description. The first stage consists in adjusting the segment in the groove whilst taking care to place it symmetrically with respect to the point of maximum depth of the groove. In this position, its outer face is thus disposed in the extension of the seats 3 and 4. The second stage consists in sliding the cylindrical member 6 on the shaft until the seat 10 comes into abutment on the seat 2 so that the seat 11 overlaps the seats 3 and 4 as well as the segment 12. When in position the bores 8 coincide with the bores 15. The labyrinth is finally secured by introducing the pins 16 into their housings and the assembly is locked by means of the plates 17 by causing the depressions 18 to come into coincidence with the holes 8.

In order to disassemble the labyrinth seal, the reverse procedure is followed. The snap plates 17 are retracted thus releasing the securing pins which once raised in relation to their receiving bores enable sliding and withdrawal of the labyrinth seal from the shaft.

In the case of rubbing of the labyrinth during operation on the fluidtight surface of the cylindrical member it cannot be entrained in rotation about the shaft because the segment comes into abutment against the bottom of the groove. Tangential forces transmitted from the labyrinth to the shaft are distributed substantially uniformally over the surface of the bottom of the groove thus avoiding local excess stresses.

However, in the case of substantial rubbing of the labyrinth against the fluidtight surface, heating up can become sufficient to cause expansion of the cylindrical member 6 and of the segment such that a clearance will arise. The segment then is no longer in abutment with the base of the groove and thus will not ensure immobilisation of the labyrinth.

Figure 3:
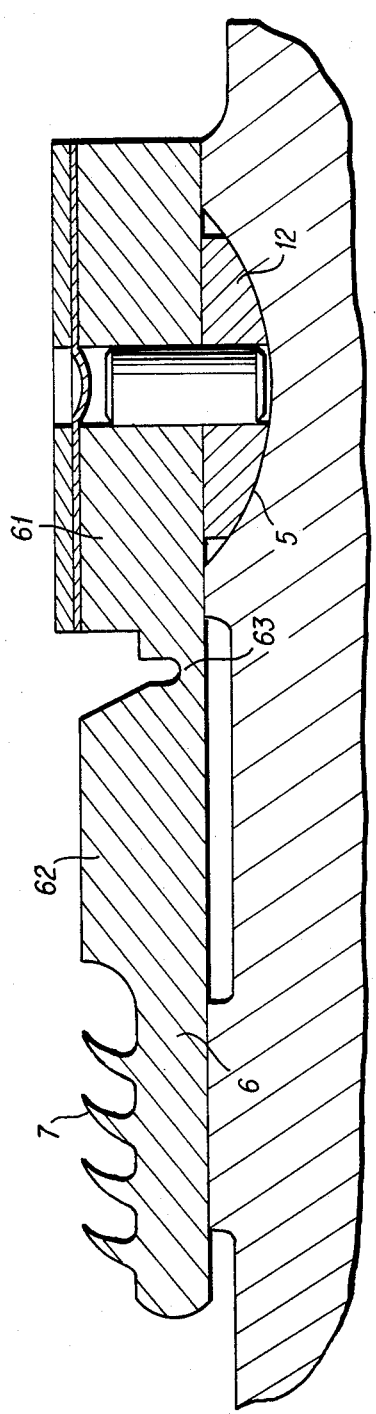
FIG. 3 illustrates a modification of an annular member forming part of the labyrinth seal of FIGS. 1 and 2.

In order to avoid this risk means are provided for retarding the propagation of heat between the lips and the connecting member. FIG. 3 illustrates a modification of the annular member applying this principle. A thermal mass 62 is provided where the cylindrical member 6 is thickest between the lips 7 and the cylindrical securing part 61, thus forming a heat sink for the calories produced by the rubbing action of the lips. So as to limit the heat flow between the mass 62 and the parts 61, these parts are interconnected by a thermal neck 63 of reduced thickness.

It will be readily apparent to those skilled in the art that the description given hereinbefore is of a preferred embodiment and the scope of the invention is defined by the claims which follow.

We claim:

1. In a turbo-machine
   means defining a labyrinth seal including
      a cylindrical member having annular lips on its outer surface, and means defining a sealing surface cooperating with the lips,
   means mounting the cylindrical member having an annular groove, and including
      an annular segment having one surface complementary to the surface of the groove and engaged in the groove and another surface engaged against the inner surface of the cylindrical member, and
   removable means for securing the segment to the cylindrical member,
   the thickness of the segment and the corresponding depth of the groove varying circumferentially so that the seal is secured relative to mounting means when the segment is made rigid with the seal by the removable securing means.

2. A turbo-machine according to claim 1 wherein the lip carrying member and the segment each have a radial bore which can be aligned and wherein the securing means comprises a pin which can engage in both bores when the latter are radially aligned.

3. A turbo-machine according to claim 2 comprising locking means serving to prevent radial displacement of the securing pin.

4. A turbo-machine according to claim 1 wherein the groove has a cross section of toroidal form and the groove is eccentric in relation to the common axis of the cylindrical member and of the means mounting the cylindrical member.

5. A turbo-machine according to claim 1 wherein the segment is in the form of a sector of a ring symmetrical with respect to its cross section of maximum thickness corresponding to the maximum depth of the groove and cut at its thinnest part in order to facilitate the introduction of the segment into the groove.

6. A turbo-machine according to claim 1 wherein the cylindrical member provides for cooperation with the said removable means for securing the segment to the cylindrical member by an extension beyond the lips provided with a plurality of radial bores cooperating with corresponding radial bores of the segment and wherein the removable securing means comprises securing pins engaged in the bores of the extension and of the segment when the bores are aligned.

7. A turbo-machine according to claim 6 wherein the extension has slots extending longitudinally of the axis of the turbo-machine and extending perpendicularly to the corresponding bores, the securing means further comprising plates having a depression therein, which plates in order to lock the pins engage in the slots in the depression located in the corresponding bores of the extension.

8. A turbo-machine according to claim 6 wherein the extension includes a relatively thick part serving as a thermal sink and a relatively thin part forming a thermal barrier in order to limit the propogation of heat between the lips of the labyrinth seal and the means serving to secure the seal to the means mounting the cylindrical member.

* * * * *